US010095600B2

(12) United States Patent
Fan et al.

(10) Patent No.: US 10,095,600 B2
(45) Date of Patent: Oct. 9, 2018

(54) REAL-TIME GLOBALIZATION VERIFICATION ON DEVELOPMENT OPERATIONS

(71) Applicant: INTERNATIONAL BUSINESS MACHINES CORPORATION, Armonk, NY (US)

(72) Inventors: Yang Fan, Beijing (CN); Patrick L. Glenski, Rochester, MN (US); Syed I. Haiderzaidi, Round Rock, TX (US); Su Liu, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/288,186

(22) Filed: Oct. 7, 2016

(65) Prior Publication Data

US 2018/0101464 A1   Apr. 12, 2018

(51) Int. Cl.
G06F 9/44 (2018.01)
G06F 9/45 (2006.01)
(Continued)

(52) U.S. Cl.
CPC ............ G06F 11/3608 (2013.01); G06F 8/71 (2013.01); *G06F 8/51* (2013.01); *G06F 8/52* (2013.01);
(Continued)

(58) Field of Classification Search
CPC .......... G06F 8/30; G06F 8/71; G06F 9/44521; G06F 11/3664; G06F 11/3684; G06F 11/3688; G06F 9/44589
See application file for complete search history.

(56) References Cited

U.S. PATENT DOCUMENTS 6,507,812 B1    1/2003  Meade et al.
7,793,156 B2 *  9/2010  Tsurumi .............. G06F 11/3692
                                                     714/38.14
(Continued)

FOREIGN PATENT DOCUMENTS

WO     2013158758 A1    10/2013

OTHER PUBLICATIONS

Liu et at., "Concept of Cloud Based Globalization Verification Service", 40th Internationalization & Unicode Conference, Santa Clara, CA, USA, Nov. 2016, pp. 1-19; <http://www.unicodeconference.org/presentations/S12T2-Liu.pdf>.*

(Continued)

*Primary Examiner* — Thuy Dao
*Assistant Examiner* — Ben C Wang
(74) *Attorney, Agent, or Firm* — Cantor Colburn LLP; Joseph Petrokaitis

(57) ABSTRACT

Technical solutions are described for verifying translatability compliance of a new code for a computer program product includes receiving a notification about a check-in request for the new code, and in response determining whether to verify the translatability compliance of the new code. The method further includes, in response to the translatability compliance being verified, determining whether the new code includes a hardcoded message. Further, in response to identifying the hardcoded message, the method includes sending a warning notification to a developer of the new code. Also, the method includes enabling the check-in of the new code in response to the translatability compliance not being verified.

20 Claims, 3 Drawing Sheets

(51) Int. Cl.
  *G06F 11/36* (2006.01)
  *G06F 8/71* (2018.01)
  *G06F 9/445* (2018.01)
  *G06F 8/52* (2018.01)
  *G06F 8/51* (2018.01)

(52) U.S. Cl.
  CPC ...... *G06F 9/44521* (2013.01); *G06F 9/44589* (2013.01); *G06F 11/3688* (2013.01)

(56) References Cited

U.S. PATENT DOCUMENTS

| | | | |
|---|---|---|---|
| 8,584,085 B2 | 11/2013 | Kaulgud et al. | |
| 8,799,275 B2 | 8/2014 | Peng et al. | |
| 8,812,276 B2 | 8/2014 | Aldrich et al. | |
| 8,813,046 B2* | 8/2014 | Nair | G06F 8/51 345/467 |
| 8,972,372 B2 | 3/2015 | Elbaum et al. | |
| 8,997,057 B1 | 3/2015 | Diwan et al. | |
| 9,740,601 B2* | 8/2017 | Fan | G06F 11/3692 |
| 9,767,011 B2* | 9/2017 | Fan | G06F 11/3692 |
| 2001/0013116 A1 | 8/2001 | Watanabe et al. | |
| 2008/0127103 A1* | 5/2008 | Bak | G06F 9/451 717/126 |
| 2009/0031170 A1* | 1/2009 | Tsurumi | G06F 11/3692 714/38.14 |
| 2010/0064178 A1* | 3/2010 | Dhulipalla | G06F 11/3688 714/38.14 |
| 2011/0060733 A1 | 3/2011 | Peng et al. | |
| 2011/0283260 A1 | 11/2011 | Bucuvalas | |
| 2011/0295578 A1 | 12/2011 | Aldrich et al. | |
| 2013/0007588 A1 | 1/2013 | Guo et al. | |
| 2013/0254752 A1* | 9/2013 | Nair | G06F 8/51 717/137 |
| 2015/0095895 A1 | 4/2015 | Taneja et al. | |
| 2015/0178264 A1* | 6/2015 | Liu | G06F 17/273 715/237 |
| 2016/0070640 A1* | 3/2016 | Clark | G06F 11/3684 717/124 |
| 2016/0162478 A1 | 6/2016 | Blassin et al. | |
| 2016/0210227 A1* | 7/2016 | Sridhar | G06Q 10/0633 |
| 2016/0274997 A1* | 9/2016 | Kachko | G06F 11/366 |
| 2017/0153970 A1* | 6/2017 | Fan | G06F 11/3692 |
| 2017/0153971 A1* | 6/2017 | Fan | G06F 11/3692 |
| 2017/0371631 A1* | 12/2017 | Haiderzaidi | G06F 11/3604 |
| 2017/0371687 A1* | 12/2017 | Haiderzaidi | G06F 9/454 |
| 2017/0371762 A1* | 12/2017 | Haiderzaidi | G06F 11/3604 |
| 2017/0371763 A1* | 12/2017 | Haiderzaidi | G06F 11/3604 |
| 2017/0371764 A1* | 12/2017 | Haiderzaidi | G06F 9/454 |
| 2018/0060207 A1* | 3/2018 | Elgebeely | G06F 11/3604 |
| 2018/0121330 A1* | 5/2018 | Clark | G06F 8/315 |

OTHER PUBLICATIONS

Leiva et al., "The Impact of Visual Contextualization on UI Localization", ACM, CHI 2014, Apr. 2014, pp. 3739-3742; <https://dl.acm.org/citation.cfm?id=2556982>.*

Ramler et al., "How to Test in Sixteen Languages? Automation Support for Localization Testing", IEEE, May 2017, pp. 542-543; <https://ieeexplore.ieee.org/stamp/stamp.jsp?tp=&arnumber=7928013>.*

McKethan et al., "Demystifying Software Globalization", Translation Journal, vol. 9, No. 2, Apr. 2005, pp. 1-10.

* cited by examiner

REAL-TIME GLOBALIZATION VERIFICATION ON DEVELOPMENT OPERATIONS

BACKGROUND

The present application relates to computing technology, and more specifically, to improving efficiency of developing computer systems.

Computing is a global industry, where 92% of the world population resides in non-English speaking countries, and 73% of internet users are non-English speaking users. Further, 73% of the world's gross domestic product is accounted for from the non-English speaking countries. Accordingly, it is critical that organizations in the computing industry develop products and solutions that are consumable worldwide, and that the products are enabled to address unique language, cultural and business needs of global clients. Facilitating developers with tools for globalization (referred to as 'G11N'; "g" followed by 11 more letters, followed by "n") of computer program products, and further, automated tools to verify that the globalization tools have been applied in a compliant manner is a technical problem that needs to be addressed.

SUMMARY

According to one or more embodiments, a computer implemented method for verifying translatability compliance of a new code for a computer program product includes receiving a notification about a check-in request for the new code, and in response determining whether to verify the translatability compliance of the new code. The method further includes, in response to the translatability compliance being verified, determining whether the new code includes a hardcoded message. Further, in response to identifying the hardcoded message, the method includes sending a warning notification to a developer of the new code. Also, the method includes enabling the check-in of the new code in response to the translatability compliance not being verified.

According to one or more embodiments, a system for verifying translatability compliance of a new code for a computer program product includes a memory, and a processor coupled with the memory. The processor executes a translatability verification daemon process that intercepts a notification about a check-in request for the new code, and in response, determines whether to verify the translatability compliance of the new code. The translatability verification daemon process in response to the translatability compliance being verified, determines whether the new code includes a hardcoded message. Further, in response to identifying the hardcoded message, the translatability verification daemon process sends a warning notification to a developer of the new code. Alternatively, in response to the translatability compliance not being verified, the translatability verification daemon process enables the check-in of the new code.

According to one or more embodiments, a computer program product for verifying translatability compliance of a new code for a second computer program product includes a computer readable storage medium. The computer readable storage medium includes computer executable instructions. The instructions perform a method that includes intercepting a notification about a check-in request for the new code. The method further includes, in response to the interception, determining whether to verify the translatability compliance of the new code. If the translatability compliance is to be verified, whether the new code includes a hardcoded message is determined. The method includes sending a warning notification to a developer of the new code in response to identifying the hardcoded message. The method further includes enabling the check-in of the new code in response to the translatability compliance not being verified.

BRIEF DESCRIPTION OF THE DRAWINGS

The examples described throughout the present document will be better understood with reference to the following drawings and description. The components in the figures are not necessarily to scale. Moreover, in the figures, like-referenced numerals designate corresponding parts throughout the different views.

DETAILED DESCRIPTION

Figure 1:
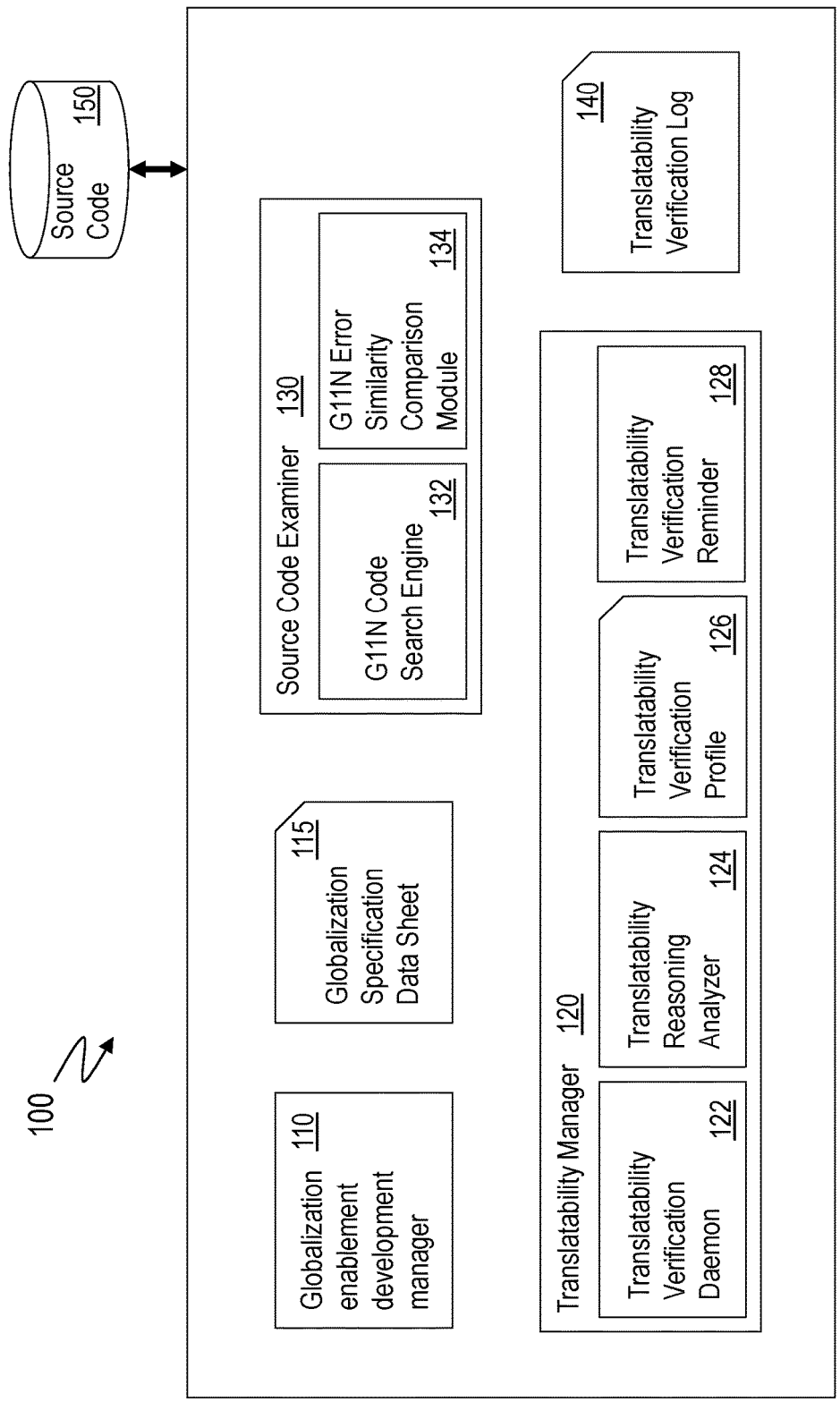
FIG. 1 illustrates an example system 100 for preventing translatability problems caused by hardcoded strings in source code in accordance with one or more embodiments.

Described here are technical solutions for automated Globalization Enablement Development (GED) and real-time Globalization Verification Test (GVT) on development operations. In one or more examples, the technical solutions facilitate real time translatability error prevention based on globalization code reasoning analysis, source code semantic examination (semantic globalization enablement code search, translatability error similarity comparison), and globalization specification verification. For example, the technical solutions include detecting hardcoded errors during GED stage for enhancing the quality of GED on development operations. To this end, the technical solutions include verifying, in real time, globalization enablement of newly developed code by comparing translatability features of the new code to design specifications and predetermined globalization specifications. For example, the technical solutions may include applying translatability reasoning analysis to checked-in source code change providing real-time translatability violation warning message to developers who are tracking translatability issues and problems. As such, the technical solutions are rooted in and/or tied to computer technology in order to overcome a problem specifically arising in the realm of computers, specifically software and computing system development, particularly compliant with globalization specifications.

Program Integrated Information (PII) is a modern standard globalization enablement approach used for string (or text) information displayed in a user interface, such as a graphical user interface (GUI). In computer program products that use PII, one or more of the strings to be displayed in the GUI are stored in external file(s) and these strings from the external file(s) are translated separately, typically without context. A Translation Verification Test (TVT), which is performed with the computer program product in operation, is used for finding an inappropriate translation(s) of a string in the computer program product. It is intrinsically difficult for a TVT to determine whether a string is hardcoded.

The technical solutions described herein are based on software development operations (such as DevOps) that recognize an increasing overlap between the globalization enablement development and globalization verification test functions, and which use PII for translation of text in the computer program product. For example, DevOps can be characterized by continuous deployment, delivery, and verification of software, along with agile globalization enablement development. In one or more examples, a portion of a software product's suite of globalization verification test cases are included in DevOps to facilitate the globalization enablement development function. The suite of globalization verification test cases may be packaged with the enterprise globalization enablement software product and shipped to a customer for use as real-time diagnostics.

However, typically in product development, such as in software development, globalization enablement work is error prone. Typically, developers add messages (such as help, usage, warning, error, status) into source code as hardcoded message strings. The examples herein consider that the hardcoded strings are in English, however, it is understood that in other examples the hardcoded strings may be in some other language, such as Chinese, Korean, Russian, and the like. Further yet, development tools such as graphical user interface (GUI) based development tools may mislead developers to add hardcoded strings (e.g. usage message, menu name, button names etc.) in the source code.

Such hardcoded strings embedded within the source code of a computer program product cause technical problems when the computer program product is executed by a user who is not a native speaker of the languages in which the hardcoded messages are written. For example, the hardcoded strings cause translatability problems because a hardcoded message cannot be translated at runtime. For example, a recent study indicates that ⅓ of the total translation verification test errors during development of computer program products are problems caused by hardcoded strings in the source code of the computer program products.

In software development environments (such as DevOps), typically do not have an automated real-time method to check such translatability problems. Accordingly, described herein are technical solutions to analyze globalization translatability features and code that are newly added during development, and detect hardcoded strings during development that can lead to translatability problems. Further, the technical solutions provide techniques for an automated GED and real-time GVT for development operations.

Exemplary embodiments herein include a real time translatability error prevention method based on globalization code reasoning analysis, source code semantic examination (semantic globalization enablement code search, translatability error similarity comparison), and globalization specification verification. The embodiments thus detect hardcoded errors during a Globalization Enablement Development (GED) stage for enhancing quality of GED in the development environment.

FIG. 1 illustrates an example system 100 for preventing translatability problems caused by hardcoded strings in source code 150 of a computer program product. The system 100 includes, among other components, a globalization enablement development manager 110, a globalization specification data sheet 115, a translatability manager 120, a source code examiner 130, and a translatability verification log 140. The components may each be an electronic circuitry and/or a computer program product. The system 100 has access to a repository of the source code 150 for the computer program product that is to be examined for translatability problems.

In one or more embodiments, the globalization enablement development manager 110 is a user interface to manage globalization translatability configuration settings and fix development errors in real-time. For example, a developer can enable and/or disable real-time globalization translatability verification features described herein via the globalization enablement development manager 110. Further, the globalization enablement development manager 110 facilitates an entity, such as a quality assurance (QA) team to specify one or more specific types of globalization errors to be identified in the DevOps environment.

In one or more embodiments, the globalization specification data sheet 115 provides a high level predefined globalization enablement checklist. The globalization specification data sheet 115 may be prepared during high-level design for the computer program product being examined. For example, one or more software developer determines if the computer program product includes messages that are to be translated for different users in different regions. Further, the globalization specification data sheet 115 may specify a layout for one or more user-interface elements, where the layout depends on the translated messages. In one or more embodiments, the computer program product may specify parameters regarding the translation of the messages as well as modification of the layout of the user interface associated with the translation. The parameters may include a character set to be used (for example, UTF8), an indicator that identifies whether the translation is to be performed (for example, Need_PII=true), a maximum buffer for the translated message (for example, 4096). The maximum buffer may specify a maximum number of characters that may be used for the translated message.

In one or more embodiments, the translatability manager 120 includes a translatability verification daemon 122, a translatability reasoning analyzer 124, one or more translatability verification profiles 126, and a translatability verification reminder 128. The translatability verification daemon 122 is a computer program product (backend) that handles translatability verification operations for the translatability manager 120. For example, based on the translatability verification profiles 126, In one or more embodiments, the translatability verification daemon 122 automatically checks for hardcoded messages before checking-in a new code into the source code 150.

The translatability reasoning analyzer 124 may be a separate computer program product or a module that checks the logic of the source code 150 to determine globalization enablement translatability. For example, if the source code 150 is associated with Need_PII (translation)=True, then the translatability reasoning analyzer 124 checks if there is sequence API calls, such as setlocale( )→catopen( )-catcgets( ), or any other translation related API calls in the new code that is being checked into the source code 150. The translatability reasoning analyzer 124 further checks if the correct set and message IDs are defined and called in the new code being checked in. In addition, the translatability reasoning analyzer 124 checks if a corresponding translation directory and a translation file have been created to assist with the translation.

Further yet, if the globalization specification datasheet 115 indicates that Need_PII=True, the translatability reasoning analyzer 124 works with the source code examiner 130 to detect instructions that include hardcoded messages embedded within the instructions. Table 1 illustrates one or more examples of instructions that include hardcoded messages, such as strings.

TABLE 1

```
public class HardCodedStrings {
    public static void main(String[ ] args) {
        System.out.println("Hello World! How wonderful!");
        System.out.println("But this world is a mess!");
        System.out.println("Goodbye, cruel world!");
```

The source code examiner 130 is a toolkit that syntactically or/and semantically examines the globalization enablement code and APIs according to keywords. The source code examiner 130 includes, among other components, a G11N code search engine 132 and a G11N error similarity comparison module 134. In one or more embodiments, the G11N code search engine 132 searches similar or existing globalization enabled functions in the source code 150 based on the new code and regiments of the globalization specification datasheet 115. For example, if the search engine 132 uses new add "USAGE" function name as a keyword, the G11N code search engine 132 finds similar "USAGE" functions from the source code 150 and compares them to determine if the new code being checked in is compatible with the specification of the 'USAGE' function. The G11N error similarity comparison module 134 compares the new code being checked in with existing defect repository to determine if there are defects in the new code by identifying patterns from the defect repository in the new code.

For example, Table 2 illustrates example new code for a function named 'usage'. It is understood that in other examples different new code can be used.

TABLE 2

```
/*
 *  FUNCTION: usage
 *  DESCRIPTION:  Prints a usage statement for runme command.
 */
void usage(void)
{
    nl_catd catd;
    catd = catopen(MF_LOCALE,NL_CAT_LOCALE);
    printf(catgets(catd, LOCALE, ERR_USAGE, "help
message"));
    exit(1);
}
```

In the example in Table 2, the line [printf(catgets(catd, LOCALE, ERR_USAGE, "help message"));] follows predefined PII rules to call a "catgets" function for retrieving a translated message instead of directly printing out a hardcoded string "help message".

Table 3 illustrates defective version of the new code in which the printf function outputs a hardcoded string 'help message.'

TABLE 3

```
/*
 *  FUNCTION: usage
 *  DESCRIPTION:
 *  Prints a usage statement for runme command.
 */
void usage(void)
{
    nl_catd catd;
    catd = catopen(MF_LOCALE,NL_CAT_LOCALE);
    printf("help message"));  ← WRONG!
    exit(1);
}
```

The defect repository may include such defective use of program instructions for the module 134 to compare. In one or more embodiments, the specific instruction may be marked as a defect, as illustrated in Table 3 (see printf). Thus, if a developer tries to check-in the new code, for example a file with the usage function, the G11N error similarity comparison module 134, upon comparing the new code with the defect repository, identifies that the new code has a translatability error, and consequently an error is reported. Further, the check-in may be halted.

Referring back to the translatability manager 120, the translatability verification log 140 is a file for recording translation verification issues and errors identified by the translatability manager 120 and/or issues and errors that the computer program product experienced so far. The issues and errors in translatability are stored in the verification log 140 for future reference, such as to identify one or more patterns to be detected in the new code being checked into the source code 150.

Further, the translatability verification reminder 128 sends reminder message(s) to developers and indicates possible G11N errors and issues found regarding translatability verification during development in the source code 150 and/or new code being checked into the source code 150.

Figure 2:
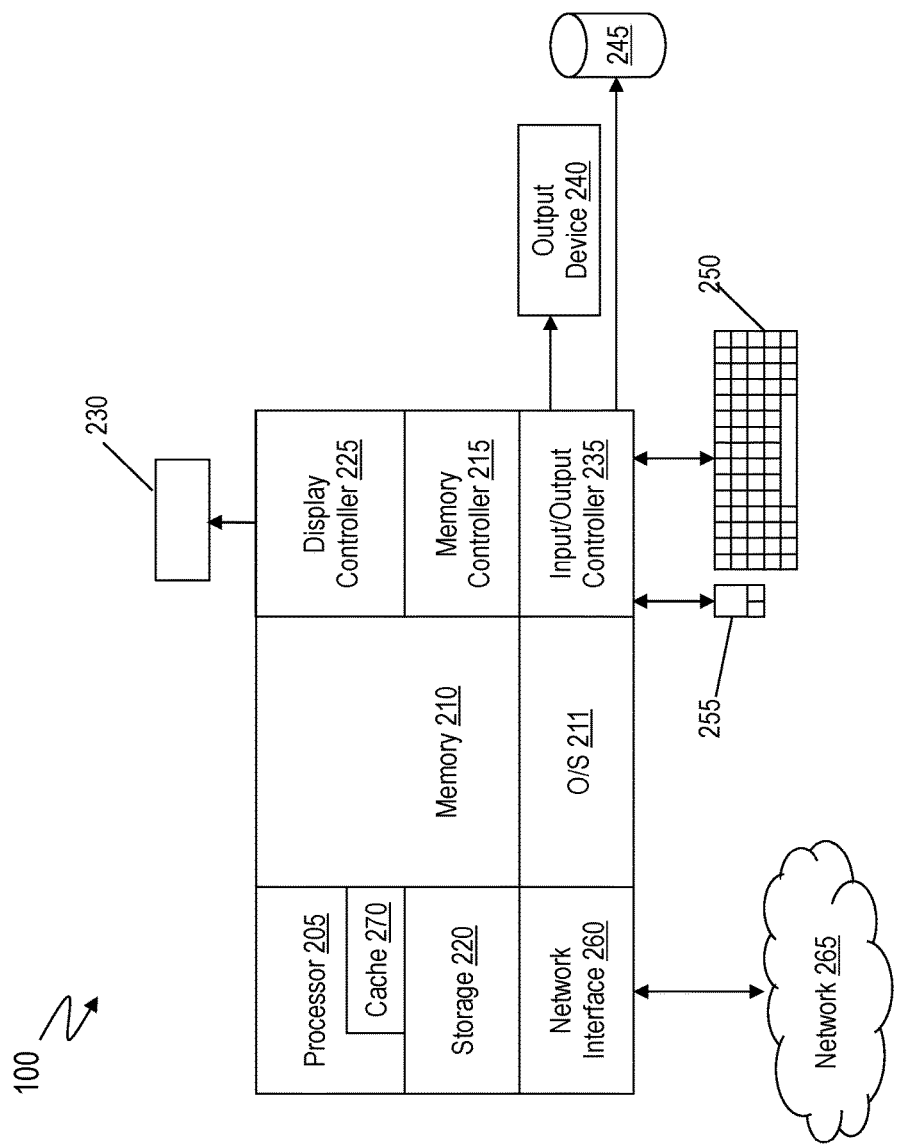
FIG. 2 illustrates an example block diagram of the system 100 in accordance with one or more embodiments.

FIG. 2 illustrates an example block diagram of the system 100, where the blocks facilitate implementation of the components illustrated in FIG. 1. The system 100 may be a communication apparatus, such as a computer. For example, the system 100 may be a desktop computer, a tablet computer, a laptop computer, a phone, such as a smartphone, a server computer, or any other device that communicates via a network 265. The system 100 includes hardware, such as electronic circuitry.

The system 100 includes, among other components, a processor 205, memory 210 coupled to a memory controller 215, and one or more input devices 245 and/or output devices 240, such as peripheral or control devices, that are communicatively coupled via a local I/O controller 235. These devices 240 and 245 may include, for example, battery sensors, position sensors (altimeter, accelerometer, GPS), indicator/identification lights and the like. Input devices such as a conventional keyboard 250 and mouse 255 may be coupled to the I/O controller 235. The I/O controller 235 may be, for example, one or more buses or other wired or wireless connections, as are known in the art. The I/O controller 235 may have additional elements, which are omitted for simplicity, such as controllers, buffers (caches), drivers, repeaters, and receivers, to enable communications.

The I/O devices 240, 245 may further include devices that communicate both inputs and outputs, for instance disk and tape storage, a network interface card (NIC) or modulator/demodulator (for accessing other files, devices, systems, or a network), a radio frequency (RF) or other transceiver, a telephonic interface, a bridge, a router, and the like.

The processor 205 is a hardware device for executing hardware instructions or software, particularly those stored in memory 210. The processor 205 may be a custom made or commercially available processor, a central processing unit (CPU), an auxiliary processor among several processors associated with the system 100, a semiconductor based microprocessor (in the form of a microchip or chip set), a macroprocessor, or other device for executing instructions. The processor 205 includes a cache 270, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 270 may be organized as a hierarchy of more cache levels (L1, L2, and so on.).

The memory 210 may include one or combinations of volatile memory elements (for example, random access memory, RAM, such as DRAM, SRAM, SDRAM) and nonvolatile memory elements (for example, ROM, erasable programmable read only memory (EPROM), electronically erasable programmable read only memory (EEPROM), programmable read only memory (PROM), tape, compact disc read only memory (CD-ROM), disk, diskette, cartridge, cassette or the like). Moreover, the memory 210 may incorporate electronic, magnetic, optical, or other types of storage media. Note that the memory 210 may have a distributed architecture, where various components are situated remote from one another but may be accessed by the processor 205.

The instructions in memory 210 may include one or more separate programs, each of which comprises an ordered listing of executable instructions for implementing logical functions. In the example of FIG. 2, the instructions in the memory 210 include a suitable operating system (OS) 211. The operating system 211 essentially may control the execution of other computer programs and provides scheduling, input-output control, file and data management, memory management, and communication control and related services.

Additional data, including, for example, instructions for the processor 205 or other retrievable information, may be stored in storage 220, which may be a storage device such as a hard disk drive or solid state drive. The stored instructions in memory 210 or in storage 220 may include those enabling the processor to execute one or more aspects of the systems and methods described herein.

The system 100 may further include a display controller 225 coupled to a user interface or display 230. In some embodiments, the display 230 may be an LCD screen. In other embodiments, the display 230 may include a plurality of LED status lights. In some embodiments, the system 100 may further include a network interface 260 for coupling to a network 265. The network 265 may be an IP-based network for communication between the system 100 and an external server, client and the like via a broadband connection. In an embodiment, the network 265 may be a satellite network. The network 265 transmits and receives data between the system 100 and external systems. In some embodiments, the network 265 may be a managed IP network administered by a service provider. The network 265 may be implemented in a wireless fashion, for example, using wireless protocols and technologies, such as WiFi, WiMax, satellite, or any other. The network 265 may also be a packet-switched network such as a local area network, wide area network, metropolitan area network, the Internet, or other similar type of network environment. The network 265 may be a fixed wireless network, a wireless local area network (LAN), a wireless wide area network (WAN) a personal area network (PAN), a virtual private network (VPN), intranet or other suitable network system and may include equipment for receiving and transmitting signals.

Figure 3:
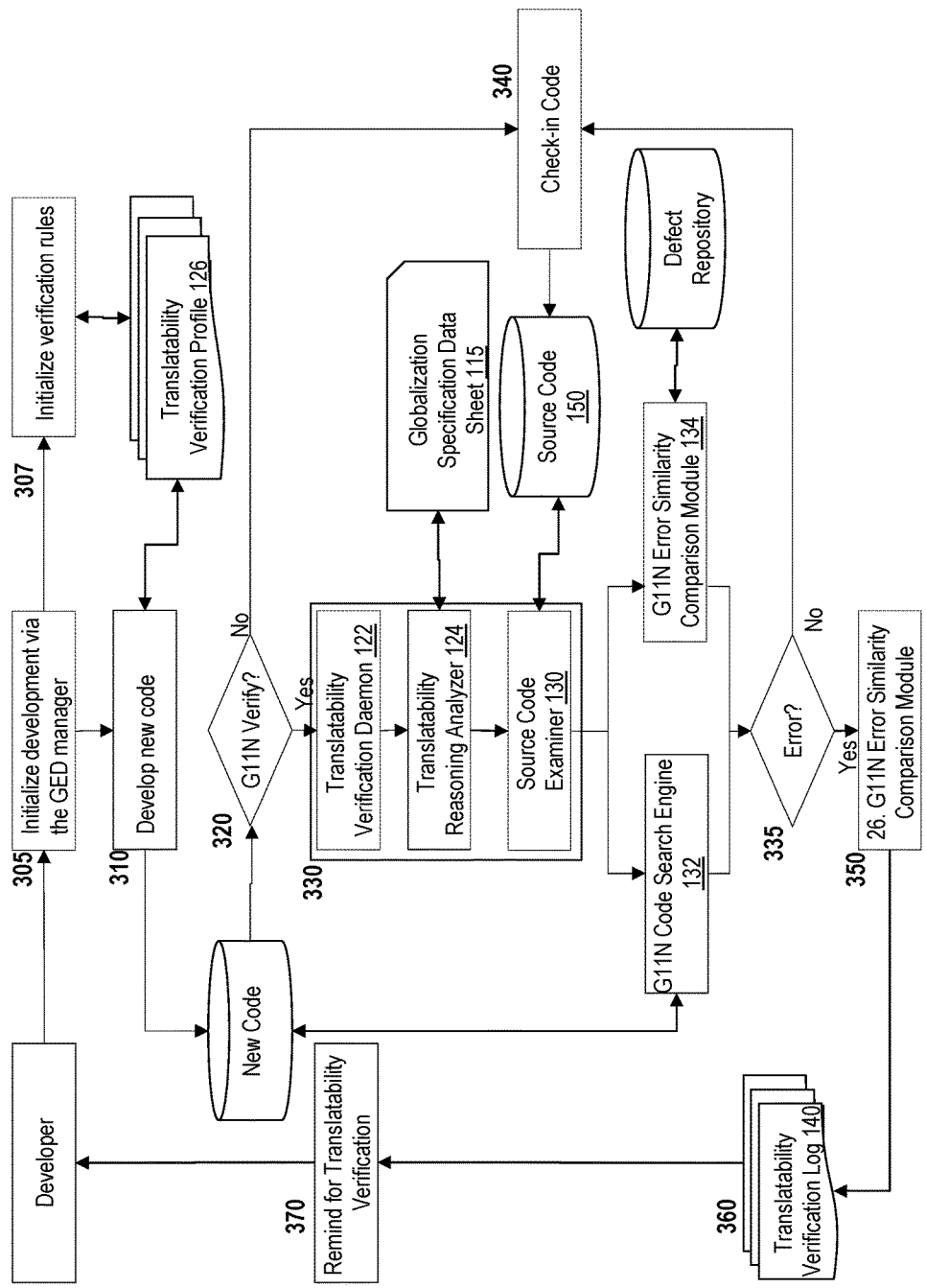
FIG. 3 illustrates a flow diagram of an example method for verifying that computer program products are globalization enabled in accordance with one or more embodiments.

FIG. 3 illustrates a flow diagram of an example method for verifying that computer program products are globalization enabled. In one or more embodiments, a developer implements and initiates the globalization enablement development manager 110, as shown at 305. Initializing the globalization enablement development via the GED manager 110 includes specifying globalization verification rules based on the translatability verification profile(s) 126, as shown at 307. Further, using the globalization enablement development manager 110 new code is generated, as shown at 310. The new code is one or more computer executable instructions that are part of the computer program product being developed. Alternatively or in addition, the new code may be one or more computer executable instructions that test one or more parts of the computer program product. In one or more examples, the new code represents a change to the source code 150.

The translatability manager 120 verifies the new code developed using the globalization enablement development manager 110 in real time, as shown at 320. In one or more embodiments, the translatability manager 120 determines whether the new code is to be verified for G11N compliance, as shown at 320. For example, the translatability manager 120 makes the determination based on the attributes in the verification profiles 126 associated with the computer program product. In one or more embodiments, the translatability manager 120 makes the determination in response to a check-in process initiated for the new code. For example, the 'check-in' may be an event generated by a source code control system (such as, VISUAL SOURCE SAFE™, GITHUB™, JAZZ™, and the like). In one or more embodiments the repository of the source code 150 is the source code control system. The translatability manager 120 makes the determination before the new code is checked into the source code 150. In one or more embodiments, the translatability manager 120, via the translatability verification daemon process 122, receives a notification of the check-in request for the new code from the repository for the source code 150. Alternatively or in addition, the translatability verification daemon 122 intercepts the request for the check-in when the request is sent to the repository of the source code 150.

If the new code is to be verified for G11N compliance, based on the verification rules, in one or more embodiments, the translatability verification daemon 122 verifies the new code before the new code is checked in, as shown at 330. Alternatively, if the new code is not to be verified for G11N compliance the new code is checked in, as shown at 340.

The translatability verification daemon 122 is a background process that is monitoring the development of the new code. The translatability verification daemon 122 determines compliance of the new code with the verification rules each time a check-in is initiated, and if the new code is to be G11N verified. In one or more embodiments, the verification includes comparing a translatability feature in the new code to globalization specification data sheet 115 and a design specification of the computer program product being developed. The verification further includes applying translatability reasoning analysis to the new code by the translatability reasoning analyzer 124. For example, Table 4 illustrates another a new code that includes another version of the 'usage' function.

TABLE 4

```
/*
 *   FUNCTION: usage
 *   DESCRIPTION:
 *   Prints a usage statement for runme command.
 */
void usage(void)
{
    nl_catd catd;
    setlocale (LANG,""); <<<<
```

TABLE 4-continued

```
catd = catopen(MF_LOCALE,NL_CAT_LOCALE);
    printf(catgets(catd, LOCALE, ERR_USAGE, "help
message"));
    exit(1);
}
```

The illustrated function in Table 4 complies with the predefined PII rules because the G11N API calling sequence order follows a predetermined order that is specified in the globalization specification datasheet 115. For example, the order may be setlocale→catopen→catgets. In this example, setlocale sets the appropriate language to indicate to the catopen function where it can load a translated message. The subsequent call to the catgets function accordingly can get the appropriate translated message to be output. The translatability reasoning analysis module 124 checks such logic of the G11N API calls, for example an execution order of the function calls in the new code to determine if the translatability calling is valid (or has a translatability error).

Further, in another example, the new code illustrated in Table 5 depicts the 'usage' function that is noncompliant with the PII rules. In this case, the translatability reasoning analysis module 124 detects the translatability error based on the API calling sequence catopen→setlocale→catgets not matching (or mismatching) with the predetermined order of G11N API calls. In one or more embodiments, the GED manager 110 may specify the G11N API function calls and corresponding implementation. In the illustrated example, the catopen function call cannot load a right translation file because the appropriate language has not been set before loading because of the incompliant sequence of G11N API function calls.

TABLE 5

```
/*
 *   FUNCTION: usage
 *   DESCRIPTION:
 *   Prints a usage statement for runme command.
 */
void usage(void)
{
    nl_catd catd;
    catd = catopen(MF_LOCALE,NL_CAT_LOCALE);
        setlocale (LANG,""); <<<
    . . .
```

If an error is identified, the method includes notifying the developer(s) in real-time with a translatability violation warning message, as shown at 335 and 350. If there is no translatability related error in the new code, the new code is checked-in to the source code 150, as shown at 340.

In the case of the translatability error, the new code is not checked into the source code 150. For example, the translatability verification daemon 122 cancels the check-in request for the new code.

Further, in one or more embodiments, in the case of the translatability error, the source code examiner 130 compares the identified error with translatability errors that were previously identified. For example, the previous defects may be stored in a defect repository, which may be a database system. The defect repository may categorize the errors, for example, based on the portion of the computer program product, the developer that developed the new code, one or more languages that cause the translatability incompliance, and the like. The warning message sent to the developer may include an identification of the category into which the currently identified error can be classified. In one or more examples, the currently identified error may be classified into one or more defect categories. Further yet, the defect repository may keep track of a solution that was previously employed to resolve the earlier defects. The warning message may include information, such as a hyperlink, summary, or the like about the earlier solution(s) to facilitate the developer to address the currently identified error.

Further yet, the method includes logging information about the currently identified translatability error in an error entry the translatability verification log 140, as shown at 360. The error entry keeps track of the identified error and whether the error has been addressed by a subsequent change to the source code 150. Until the error has not been addressed, the translatability verification reminder 128 periodically sends a reminder to the developer responsible for addressing the error, as shown at 370. The error entry stored in the log 140 is associated with an identity and/or a communication address associated with the one or more developer associated with the new code. The identity and/or the communication address facilitates the translatability verification reminder 128 to send periodic reminders to the developer(s) to address the error.

In one or more embodiments, the translatability verification reminder 128 checks the translatability verification log 140 at a predetermined frequency and scans if each of the errors logged in the log 140 have been addressed since prior iteration. If an error has been resolved, the developer indicates that the error has been resolved, for example by manipulating an indicator, such as an indicator field in the log 140. The translatability verification reminder 128 may remove the error that has been addressed from the log 140. If an error in the log 140 has not been addressed, the translatability verification reminder 128 sends a reminder to the developer(s) associated with the error to address the error.

The technical solutions thus facilitate developing computer program product with improved performance, at lower costs for globalization enablement and QA management. Thus, the technical solutions described herein facilitates developers to simplify development of improved quality computer program products by proactively verifying globalization enablement and translatability before new code is checked in to a repository of source code.

The present technical solutions may be a system, a method, and/or a computer program product at any possible technical detail level of integration. The computer program product may include a computer readable storage medium (or media) having computer readable program instructions thereon for causing a processor to carry out aspects of the present technical solutions.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present technical solutions may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present technical solutions.

Aspects of the present technical solutions are described herein with reference to flowchart illustrations and/or block diagrams of methods, apparatus (systems), and computer program products according to embodiments of the technical solutions. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present technical solutions. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

A second action may be said to be "in response to" a first action independent of whether the second action results directly or indirectly from the first action. The second action may occur at a substantially later time than the first action and still be in response to the first action. Similarly, the second action may be said to be in response to the first action even if intervening actions take place between the first action and the second action, and even if one or more of the intervening actions directly cause the second action to be performed. For example, a second action may be in response to a first action if the first action sets a flag and a third action later initiates the second action whenever the flag is set.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are to be construed in the broadest sense, superseding any other implied definitions hereinbefore or hereinafter unless expressly asserted to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

It will also be appreciated that any module, unit, component, server, computer, terminal or device exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Such computer storage media may be part of the device or accessible or connectable thereto. Any application or module herein described may be implemented using computer readable/executable instructions that may be stored or otherwise held by such computer readable media.

The descriptions of the various embodiments of the present technical solutions have been presented for purposes of illustration, but are not intended to be exhaustive or limited to the embodiments described. Many modifications and variations will be apparent to those of ordinary skill in the art without departing from the scope and spirit of the described embodiments. The terminology used herein was chosen to best explain the principles of the embodiments, the practical application, or technical improvement over technologies found in the marketplace, or to enable others of ordinary skill in the art to understand the embodiments described herein.

What is claimed is:

1. A computer implemented method for verifying translatability compliance of natural language embedded in a new code for a computer program product, the method comprising:
   receiving a notification about a check-in request for the new code;
   in response, determining whether to verify the translatability compliance of the natural language embedded in the new code;
   in response to the translatability compliance being verified:
      determining whether the new code includes a hardcoded message; and
      in response to identifying the hardcoded message, sending a warning notification to a developer of the new code, the warning message includes a hyperlink to a defect repository, the hyperlink providing the developer an earlier solution used to address the translatability compliance; and
   in response to the translatability compliance not being verified, enabling the check-in of the new code.

2. The computer implemented method of claim 1, wherein:
   further in response to identifying the hardcoded message in the new code, logging an error entry in a translatability verification log.

3. The computer implemented method of claim 2, wherein the error entry includes a communication address of the developer of the new code.

4. The computer implemented method of claim 2, further comprising:
   monitoring the verification log to identify whether the error entry has been addressed; and
   in response to the error entry being unaddressed, sending a reminder to the developer based on a communication address of the developer stored in the error entry.

5. The computer implemented method of claim 1, wherein:
   further in response to identifying the hardcoded message in the new code, cancelling the check-in of the new code in a repository of a source code of the computer program product.

6. The computer implemented method of claim 1, wherein determining whether to verify the translatability compliance of the natural language embedded in the new code is based on a globalization specification datasheet associated with the computer program product.

7. The computer implemented method of claim 6, wherein the globalization specification datasheet specifies one or more parameters indicative of translation requirement of the computer program product.

8. A system for verifying translatability compliance of natural language embedded in a new code for a computer program product, the system comprising:
   a memory; and
   a processor coupled with the memory, the processor configured to execute a translatability verification daemon process, wherein the translatability verification daemon process is configured to perform a method comprising:
      intercepting a notification about a check-in request for the new code;
      in response, determining whether to verify the translatability compliance of the natural language embedded in the new code;
      in response to the translatability compliance being verified:
         determining whether the new code includes a hardcoded message; and
         in response to identifying the hardcoded message, sending a warning notification to a developer of the new code, the warning notification includes a hyperlink to a defect repository, the hyperlink providing the developer access to an earlier solution used to address the translatability compliance; and
      in response to the translatability compliance not being verified, enabling the check-in of the new code.

9. The system of claim 8, wherein:
   further in response to identifying the hardcoded message in the new code, logging an error entry in a translatability verification log.

10. The system of claim 9, wherein the error entry includes a communication address of the developer of the new code.

11. The system of claim 9, wherein the method further comprises:
    monitoring the verification log to identify whether the error entry has been addressed; and
    in response to the error entry being unaddressed, sending a reminder to the developer based on a communication address of the developer stored in the error entry.

12. The system of claim 8, wherein:
    further in response to identifying the hardcoded message in the new code, cancelling the check-in of the new code in a repository of a source code of the computer program product.

13. The system of claim 8, wherein determining whether to verify the translatability compliance of the natural language embedded in the new code is based on a globalization specification datasheet associated with the computer program product.

14. The system of claim 13, wherein the globalization specification datasheet specifies one or more parameters indicative of translation requirement of the computer program product.

15. A computer program product for verifying translatability compliance of natural language embedded in a new code for a second computer program product, the computer program product comprising a computer readable storage medium, the computer readable storage medium comprising computer executable instructions, wherein the computer readable storage medium comprises instructions to perform a method comprising:
- receiving a notification about a check-in request for the new code;
    - in response, determining whether to verify the translatability compliance of the natural language embedded in the new code;
    - in response to the translatability compliance being verified:
        - determining whether the new code includes a hardcoded message; and
        - in response to identifying the hardcoded message, sending a warning notification to a developer of the new code, the warning notification includes a hyperlink to a defect repository, the hyperlink providing the developer access to an earlier solution used to address the translatability compliance; and
    - in response to the translatability compliance not being verified, enabling the check-in of the new code.

16. The computer program product of claim 15, wherein:
further in response to identifying the hardcoded message in the new code, logging an error entry in a translatability verification log.

17. The computer program product of claim 16, wherein the error entry includes a communication address of the developer of the new code.

18. The computer program product of claim 16, wherein the method further comprises:
- monitoring the verification log to identify whether the error entry has been addressed; and
- in response to the error entry being unaddressed, sending a reminder to the developer based on a communication address of the developer stored in the error entry.

19. The computer program product of claim 15, wherein:
further in response to identifying the hardcoded message in the new code, cancelling the check-in of the new code in a repository of a source code of the second computer program product.

20. The computer program product of claim 15, wherein determining whether to verify the translatability compliance of the natural language embedded in the new code is based on a globalization specification datasheet associated with the second computer program product.

* * * * *